(12) United States Patent
Kaisermayr

(10) Patent No.: US 8,326,889 B2
(45) Date of Patent: Dec. 4, 2012

(54) SYSTEMS AND METHODS FOR GENERATING CUSTOMIZING DOCUMENTATION

(75) Inventor: Martin Kaisermayr, Antibes (FR)

(73) Assignee: SAP AG, Walldorf (DE)

( * ) Notice: Subject to any disclaimer, the term of this patent is extended or adjusted under 35 U.S.C. 154(b) by 93 days.

(21) Appl. No.: 12/953,976

(22) Filed: Nov. 24, 2010

(65) Prior Publication Data

US 2012/0131062 A1 May 24, 2012

(51) Int. Cl.
*G06F 17/30* (2006.01)
(52) U.S. Cl. ......... 707/803; 707/793; 715/705; 715/744
(58) Field of Classification Search .............. 707/803, 707/793; 715/708, 705, 744
See application file for complete search history.

(56) References Cited

U.S. PATENT DOCUMENTS

| 7,168,062 | B1 * | 1/2007 | Schmitter | 717/110 |
| 7,752,224 | B2 * | 7/2010 | Davis et al. | 707/793 |
| 7,978,618 | B2 * | 7/2011 | Richardson et al. | 370/252 |
| 2008/0133303 | A1 | 6/2008 | Singh et al. | |
| 2008/0172612 | A1 * | 7/2008 | Allen et al. | 715/708 |
| 2008/0215957 | A1 | 9/2008 | Rapp et al. | |
| 2010/0058113 | A1 | 3/2010 | Rapp et al. | |

OTHER PUBLICATIONS

U.S. Appl. No. 11/864,866, filed Sep. 28, 2007, Becker et al.
U.S. Appl. No. 11/864,786, filed Sep. 28, 2007, Kaisermayr et al.

* cited by examiner

*Primary Examiner* — Dennis Truong
(74) *Attorney, Agent, or Firm* — Fish & Richardson P.C.

(57) ABSTRACT

The present disclosure involves systems, products, and methods for generating software documentation. One method includes operations for identifying a transport request containing information associated with a set of software modifications; identifying at least one view identified by the transport request, each identified view comprising a modified view of information associated with the software; accessing metadata information describing a structure for each identified view; identifying at least one database table associated with each identified view; accessing, for each identified database table, at least one database table field modified by the transport request and values associated with each of the database table fields; outputting, for each identified view, at least a portion of the set of metadata information describing the structure of the identified view; and outputting, for each identified database table associated with each identified view, at least a portion of the values associated with each database table field.

18 Claims, 7 Drawing Sheets

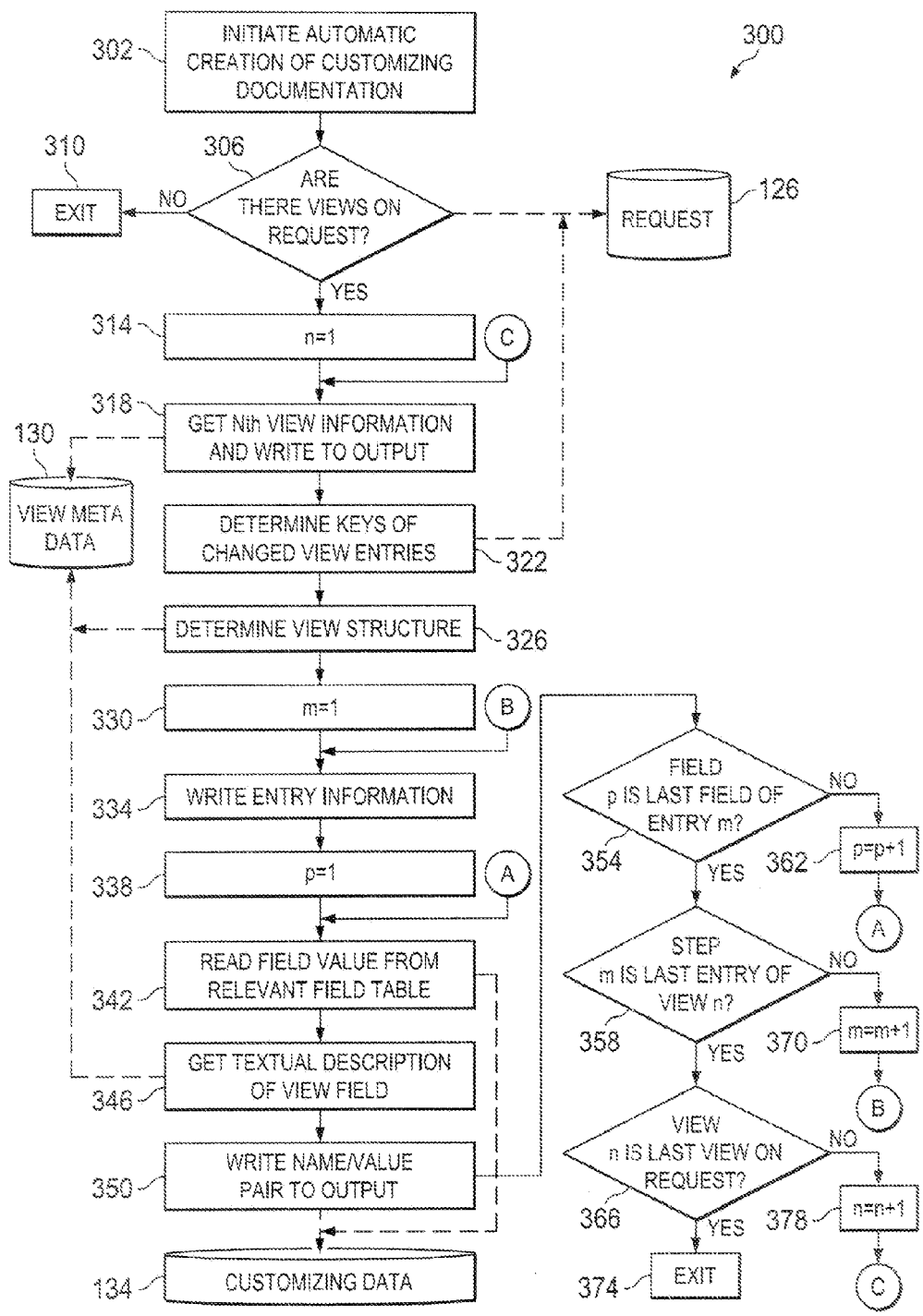

Change View "Item Template for Calculation Step Template": Overview

Item Template for Calculation Step Template

| Categ... | Calculation Step Cat. | Deb./Cr... | Item T... | Item Template Desc. |
|---|---|---|---|---|
| OT84 | Inst. Res. Trans. Acc. to Imp. Ind. (L-S) | Credit | 0J10 | Financial Instrument Revenue |
| OT84 | Inst. Res. Trans. Acc. to Imp. Ind. (L-S) | Debit | 0J11 | Financial Instrument Cost |
| OT85 | Accrual Hedge Adjustment | Credit | 0J29 | Cost from Hedge Adjustment |
| OT85 | Accrual Hedge Adjustment | Debit | 0J28 | Revenue from Hedge Adjustment |
| OT86 | Pro Rata Inflow: Hedge Adj fr Int Inflow | Credit | 0J63 | Transfer Posting of Hedge Adj.;(Credit) |
| OT86 | Rata Inflow: Hedge Adj fr Int Inflow | Debit | 0J62 | Transfer Posting of Hedge Adj.;(Debit) |
| OT87 | | Credit | 0J63 | Transfer Posting of Hedge Adj.;(Credit) |
| OT87 | | Debit | 0J62 | Transfer Posting of Hedge Adj.;(Debit) |
| OT90 | Corr.: Ineff. Part of MCFH using HD App. | Credit | 0J17 | Expense: Clearing of Reval.Reserve Instr. |
| OT90 | Corr.: Ineff. Part of MCFH using HD App. | Debit | 0J16 | Revenue: Clrng of Reval.Reserve Instr. |
| OT95 | Reduction HA Unplanned Repayments | Credit | 0J29 | Cost from Hedge Adjustment |
| OT95 | Reduction HA Unplanned Repayments | Debit | 0J28 | Revenue from Hedge Adjustment |
| OT96 | Linear Amortization Hedge Adjustment | Credit | 0J29 | Cost from Hedge Adjustment |
| OT96 | Linear Amortization Hedge Adjustment | Debit | 0J28 | Revenue from Hedge Adjustment |
| OT97 | Calculation Hedge Adjustment | Credit | J029 | Cost from Hedge Adjustment |
| OT97 | Calculation Hedge Adjustment | Debit | J028 | Revenue from Hedge Adjustment |
| OT98 | PR Outflow of Hedge Adj. (Int. Outflow) | Credit | 0J63 | Transfer Posting of Hedge Adj.;(Credit) |
| OT98 | PR Outflow of Hedge Adj. (Int. Outflow) | Debit | 0J62 | Transfer Posting of Hedge Adj.;(Debit) |

SYSTEMS AND METHODS FOR GENERATING CUSTOMIZING DOCUMENTATION

TECHNICAL FIELD

The present disclosure relates to software documentation and, more specifically, to generating software documentation associated with a transport request.

BACKGROUND

Within Enterprise Resource Planning (ERP) software, various business processes are generally controlled by complex settings based on entries within database tables and views on these database tables, or customizing views. Support entities and individuals create correction and modification instructions for modified ERP software based on the modifications to particular entries in database tables, and customizing views. In some instances, the support entities and individuals manually generate documentation of the correction and modification instructions as they relate to the particular customization settings used in creating the correction and modification instructions. The manual creation of that documentation can be time-consuming and prone to human error.

SUMMARY

The present disclosure involves systems, products, and methods for generating software documentation. One method includes operations for identifying a transport request containing information associated with a set of software modifications; identifying at least one view identified by the transport request, each identified view comprising a modified view of information associated with the software; accessing metadata information describing a structure for each identified view; identifying at least one database table associated with each identified view; accessing, for each identified database table, at least one database table field modified by the transport request and values associated with each of the database table fields; outputting, for each identified view, at least a portion of the set of metadata information describing the structure of the identified view; and outputting, for each identified database table associated with each identified view, at least a portion of the values associated with each database table field.

While generally described as computer implemented software embodied on tangible media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 3 is a flowchart of an example method for automatically generating software documentation based on a transport request.

FIGS. 4A-4E are example screenshots of a user interface presenting information associated with an automatic software documentation process.

DETAILED DESCRIPTION

Figure 1:
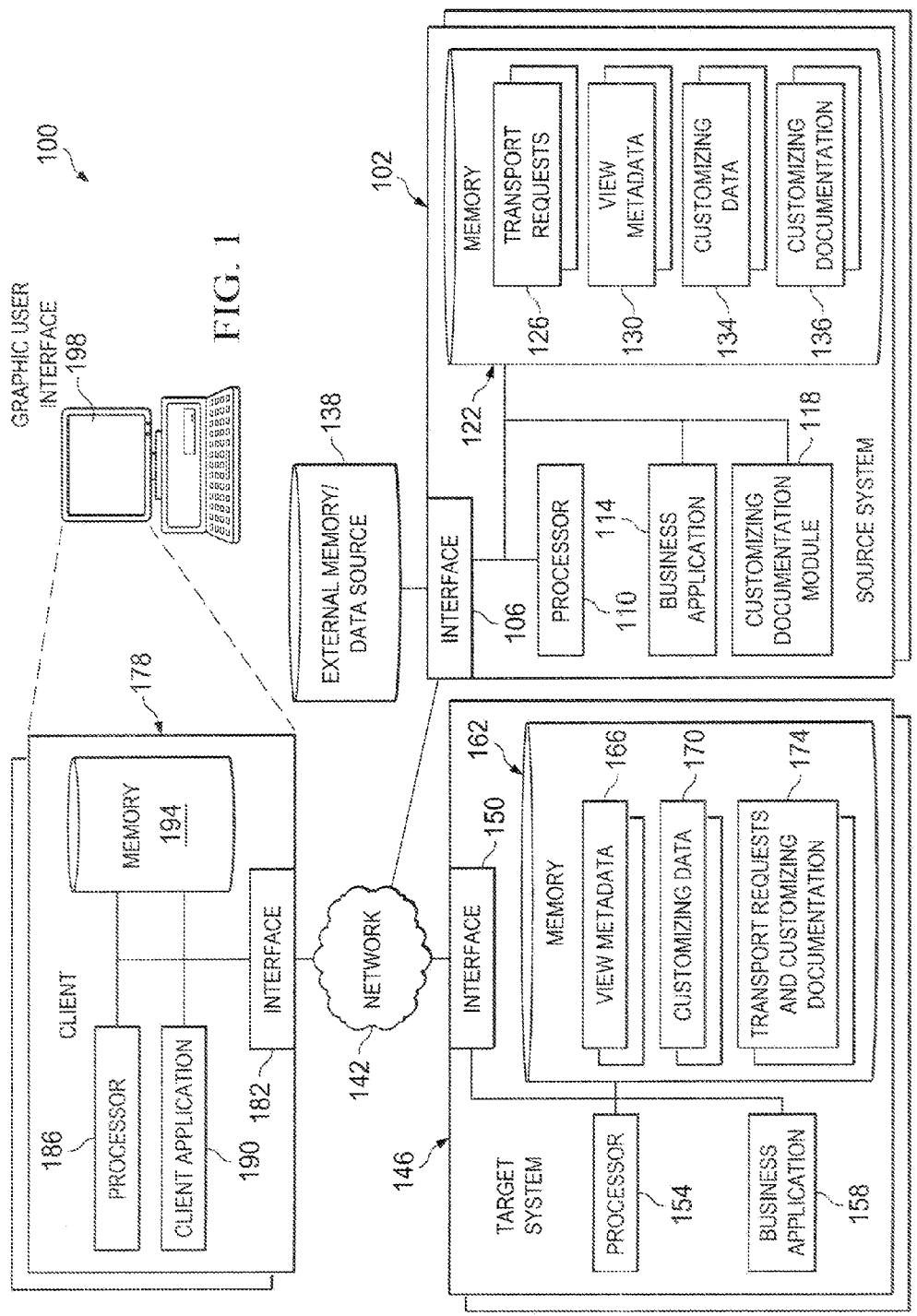
FIG. 1 illustrates an example system for generating software documentation associated with a transport request.

This disclosure generally describes software, computer-implemented methods, and systems relating to generating software documentation, where the software documentation is based on one or more modifications made to a source system and that are to be applied to a target system. In some instances, the software documentation can be created or generated automatically by using one or more existing transport requests to bundle a plurality of view maintenance entries for software transport purposes. In order to make a generic software application, such as an Enterprise Resource Planning (ERP) application that can be tailored to individual customers, users, and/or entities, customizing views associated with the underlying data and operations of the software application can be created. A customizing view may be a view of a subset of information and fields included in a particular file, as well as a view on a subset of information and fields included within a combination of two or more files. In some instances, a view may denote either a view on portions of several database tables used for customization of a particular application, as well as a view on some or all of a single database table used for customization. In general, customizing views may be sets of information which are read at run-time and define a particular set of entries associated with a particular instance of a generic software application that are used to determine how that particular instance of the application will behave. As generic software applications become more complex, additional customizing views and customized information are used to create customer-specific applications and results.

In one example, a generic software application can contain specific processing and operations for performance on one or more customized entries. For example, some generic software applications can perform operations based on a specific tax rate defined in a particular customizing view, database table, or other appropriate file or location. The customizing view can be modified based on the location of the customer executing the software. In this instance, the tax rate may be the state sales tax rate. In one instance, a first customer may want to use a value of 10% for the state sales tax in California, while a second customer may want to use a value of 5% for the state sales tax in Oregon. The generic software application is operable to perform the tasks associated with either value, and can be customized for each particular customer to reflect the appropriate data and information with which to perform its calculations. In some instances, the generic software application may be associated with a default value, or information defined for a particular set of customers. In those instances, the customizing views may be predefined, allowing some customers to execute the generic software application without modification. For those customers in other locations, however, the customizing views may be modified to represent the situation specific to those particular customers, and therefore turn the generic software application into a software application specific to those customers. By allowing the customers to modify the customizing data and information upon which the generic software application executes, the customizing data can be used as a set of customized parameters that make each instance of the generic software application a customer-specific version thereof Several situations may arise where the delivered generic software application may not be sufficient for a particular customer's needs, or where certain information may need to be changed or modified. For example, changes to the generic software application by the developer or distributor is generally provided through software patches and/or support packages, although these changes are generally provided at different times and/or intervals, and may not be available when the customer needs to perform certain modification to its instance of the generic software application. To remedy this situation, different entities and organizations may provide updates to the customization data associated with a particular instance of the application. Some examples of those instances include:

> Where a support organization, such as a third-party support entity, may need to correct an error in a customized view as delivered. In order to allow customers to implement the correction prior to implementing the corresponding software patch or support package from the first-party developer, the support organization may need to provide a detailed and field-by-field description of any database or other file entries that are to be added, deleted, and/or updated in all affected views.
>
> Where a software vendor or support organization wants or needs to provide a customizing view for a specific business scenario to one or more customers that is not provided in the general software release. In those cases, a list of all views to be considered and modified for the appropriate maintenance activities are to be provided to each customer. Again, a field-by-field description of the entries, tables, and views to be modified should be provided to the customer.
>
> Where a software customer wants to keep track of all the view entries needed to implement a customer-specific business process or task. In these instances, the software customer may need a detailed, field-by-field description of the particular customizing view entries to be modified, added, or deleted in order to implement the business process or task.

By implementing the system, methods, and techniques of the present disclosure, the time to create the descriptions associated with these use cases may be significantly reduced. In some instances, the generation of the detailed instructions may be reduced to seconds. At present, the method of creating these detailed instructions is a manual process of recording the particular views and entries which are to be modified, which may take anywhere from some minutes to several days of working time. Further, as the complexity of a particular application and/or business process increases, the complexity of the detailed description and modification instructions also increases, raising the likelihood of human error during creation of the instructions. The present disclosure describes methods and systems of automating the creation of the documentation to reduce both the time required to generate the instructions as well as the potential for human errors during generation. The generated documentation shall be referred to as "customizing documentation" throughout the present disclosure, although similar or analogous terms may be used, such as "customizing documentation" or "customizing documentation for view maintenance." In the present disclosure, customizing documentation can describe automatically generated software documentation providing textual information and description of the modifications and changes made to a particular view or set of views through modifications to customizing data and/or view metadata, which can be used by an administrator or user to stay abreast of changes to a particular system, as well as to ensure that the proper instructions are available to maintaining one or more views.

Turning to the illustrated example, FIG. 1 illustrates an example environment 100 for automatically generating software documentation associated with modifications to a customizable software application, in some instances based at least in part on information included within a transport request. The illustrated environment 100 includes, or is communicably coupled with, a source system 102, one or more target systems 146, one or more clients 178, and one or more external memory or data sources, at least some of which communicate across a network 142. In general, environment 100 depicts an example configuration of a system capable of analyzing one or more transport requests generated within the source system 102, and, along with additional information identified in association with each transport request, automatically generating correction and/or modification instructions (or customizing documentation) for users and customers associated with one or more of the target systems 146.

In general, the source system 102 is any server that stores one or more business applications 114, where at least a portion of the business applications 114 are executed via requests received from and responses sent to users or clients within and/or communicably coupled to the illustrated environment 100 of FIG. 1. In some instances, requests and responses may also be received and sent between one or more clients, users, or entities not illustrated in FIG. 1. In some instances, the source system 102 may be a Java 2 Platform, Enterprise Edition (J2EE)-compliant application server that includes Java technologies such as Enterprise JavaBeans (EJB), J2EE Connector Architecture (JCA), Java Messaging Service (JMS), Java Naming and Directory Interface (JNDI), and Java Database Connectivity (JDBC). In some instances, the source system 102 may store a plurality of various business applications 114, while in other instances, the source system 102 may be a dedicated system and/or server meant to store and execute only a single business application 114. In some instances, the source system 102 may comprise a web server or be communicably coupled with a web server, where the business applications 114 represent, at least in part, one or more web-based applications accessed and executed via network 142 by the clients 178 of the system to perform the programmed tasks or operations of the business application 114.

At a high level, the source system 102 comprises an electronic computing device operable to receive, transmit, process, store, or manage data and information associated with the environment 100. The source system 102 illustrated in FIG. 1 can be responsible for receiving application requests from one or more client applications 190 or business applications associated with the clients 178 of environment 100 and responding to the received requests by processing said requests in the associated business application 114, and sending the appropriate response from the business application 114 back to the requesting client application 190. Alternatively, the business application 114 at source system 102 can be capable of processing and responding to local requests from a user accessing source system 102 locally. Accordingly, in addition to requests from the external clients 178 illustrated in FIG. 1, requests associated with the business application 114 may also be sent from internal users, external or third-party customers, and other automated applications, as well as any other appropriate entities, individuals, systems, or computers. Further, the terms "client application" and "business application" may be used interchangeably as appropriate without departing from the scope of this disclosure.

As used in the present disclosure, the term "computer" is intended to encompass any suitable processing device. For example, although FIG. 1 illustrates a the source system 102 as a single server, environment 100 can be implemented using two or more servers for the source system 102, as well as computers other than servers, including a server pool. Indeed, source system 102 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated source system 102 may be adapted to execute any operating system, including Linux, UNIX, Windows, Mac OS, or any other suitable operating system. According to one embodiment, the source system 102 may also include or be communicably coupled with a mail server.

In the present implementation, and as shown in FIG. 1, the source system 102 includes a processor 110, an interface 106, a memory 122, one or more business applications 114, and a customizing documentation module 118. The interface 106 is used by the source system 102 for communicating with other systems in a client-server or other distributed environment (including within environment 100) connected to the network 142 (e.g., client 178, one or more target systems 146, as well as other systems communicably coupled to the network 142 not shown herein). Generally, the interface 106 comprises logic encoded in software and/or hardware in a suitable combination and operable to communicate with the network 142. More specifically, the interface 106 may comprise software supporting one or more communication protocols associated with communications such that the network 142 or interface's hardware is operable to communicate physical signals within and outside the illustrated environment 100.

Although not illustrated in FIG. 1, the source system 102 may also include a user interface, such as a graphical user interface (GUI). The GUI can comprise a graphical user interface operable to, for example, allow the user of the source system 102 to interface with at least a portion of the platform for any suitable purpose, such as creating, preparing, requesting, or analyzing data, as well as viewing and accessing source documents associated with business transactions. Generally, the GUI provides the particular user with an efficient and user-friendly presentation of business data provided by or communicated within the system. The GUI may comprise a plurality of customizable frames or views having interactive fields, pull-down lists, and buttons operated by the user. For example, the GUI may provide interactive elements that allow a user to enter or select elements of business process instances in the GUI. More generally, the GUI may also provide general interactive elements that allow a user to access and utilize various services and functions of business application 114, including any modifications and corrections that may be made to customizable data and other information associated with the business application 114. The GUI is often configurable, supports a combination of tables and graphs (bar, line, pie, status dials, etc.), and is able to build real-time portals, where tabs are delineated by key characteristics (e.g. site or micro-site). Therefore, the GUI contemplates any suitable graphical user interface, such as a combination of a generic web browser, intelligent engine, and command line interface (CLI) that processes information in the platform and efficiently presents the results to the user visually.

Generally, example source system 102 may be communicably coupled with a network 142 that facilitates wireless or wireline communications between the components of the environment 100 (i.e., between the source system 102 and one or more of the target systems 146, as well as between the source system 102 and one or more of the clients 178), as well as with any other local or remote computer, such as additional clients, servers, or other devices communicably coupled to network 142 but not illustrated in FIG. 1. In the illustrated environment, the network 142 is depicted as a single network in FIG. 1, but may be a continuous or discontinuous network without departing from the scope of this disclosure, so long as at least a portion of the network 142 may facilitate communications between senders and recipients. The network 142 may be all or a portion of an enterprise or secured network, while in another instance, at least a portion of the network 142 may represent a connection to the Internet. In some instances, a portion of the network 142 may be a virtual private network (VPN), such as, for example, the connection between the client 178 and the source system 102. Further, all or a portion of the network 142 can comprise either a wireline or wireless link. Example wireless links may include 802.11a/b/g/n, 802.20, WiMax, and/or any other appropriate wireless link. In other words, the network 142 encompasses any internal or external network, networks, sub-network, or combination thereof operable to facilitate communications between various computing components inside and outside the illustrated environment 100. The network 142 may communicate, for example, Internet Protocol (IP) packets, Frame Relay frames, Asynchronous Transfer Mode (ATM) cells, voice, video, data, and other suitable information between network addresses. The network 142 may also include one or more local area networks (LANs), radio access networks (RANs), metropolitan area networks (MANs), wide area networks (WANs), all or a portion of the Internet, and/or any other communication system or systems at one or more locations. The network 142, however, is not a required component of the present disclosure.

As illustrated in FIG. 1, source system 102 includes a processor 110. Although illustrated as a single processor 110 in FIG. 1, two or more processors may be used according to particular needs, desires, or particular embodiments of environment 100. Each processor 110 may be a central processing unit (CPU), a blade, an application specific integrated circuit (ASIC), a field-programmable gate array (FPGA), or another suitable component. Generally, the processor 110 executes instructions and manipulates data to perform the operations of source system 102 and, specifically, the one or more business applications 114 included on or within the source system 102. Specifically, the source system's processor 110 executes the functionality required to receive and respond to requests from the clients 178 and their respective client applications 190, as well as the functionality required to perform the other operations of the business application 114 and the customizing documentation module 118.

Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components, as appropriate. In the illustrated environment 100, processor 110 executes one or more business applications 114 and the customizing documentation module 118 on the source system 102.

At a high level, each of the one or more business applications 114 is any application, program, module, process, or other software that may execute, change, delete, generate, or otherwise manage information according to the present disclosure, particularly in response to and in connection with one or more requests received from the illustrated clients 178 and their associated client applications 190. In certain cases, only one business application 114 may be located at a particular source system 102. In others, a plurality of related and/or unrelated business applications 114 may be stored at the source system 102, or located across a plurality of other servers comprising the source system 102, as well. In certain cases, environment 100 may implement a composite business application 114. For example, portions of the composite application may be implemented as Enterprise Java Beans (EJBs) or design-time components, and may have the ability to generate run-time implementations into different platforms, such as J2EE (Java 2 Platform, Enterprise Edition), ABAP (Advanced Business Application Programming) objects, or Microsoft's .NET, among others. Additionally, the business application 114 may represent web-based applications accessed and executed by remote clients 178 or client applications 190 via the network 142 (e.g., through the Internet). Further, while illustrated as internal to the source system 102, one or more processes associated with a particular business application 114 may be stored, referenced, or executed remotely. For example, a portion of a particular business application 114 may be a web service associated with the application that is remotely called, while another portion of the business application 114 may be an interface object or agent bundled for processing at a remote client 178 (such as client application 190). Moreover, any or all of the business applications 114 may be a child, sub-module, or portion of another software module or enterprise application (not illustrated) without departing from the scope of this disclosure. Still further, portions of the business application 114 may be executed by a user or operator working directly at the source system 102, as well as remotely at client 178.

As illustrated and as described above, the processor 110 can also execute the customizing documentation module 118 that can be used in associated with, or embedded within, one or more of the business applications 114. In some implementations, the customizing documentation module 118 can be executed by a different processor or server external to the source system 102, such as by a server or other system communicably coupled to the source system 102 through network 142. For example, the customizing documentation module 118 may be provided as an on-demand service through a cloud computer network, such as a web service accessible via network 142, or as a service provided on a dedicated server or other computer. The customizing documentation module 118 can be used to automatically generate correction and/or modification (or customizing) documentation for changes made to the source system 102, which may then be used by one or more users, administrators, or processes at one or more target systems 146 to perform similar updates and/or changes to those systems 146. In one implementation, the customizing documentation module 118 can be used in connection with a transport request 126 generated in or associated with the source system 102. As illustrated in FIG. 1, memory 122 may store a set of transport requests 126 used to transfer data from one installation of a particular business application 114 to another (i.e., 158). As illustrated herein, the source system 102 represents a development system where various modifications and changes to a development business application 114 may be made and tested. Once the changes are finalized and confirmed, a transport request 126 associated with the changes can be created, with the transport request 126 containing information on the changes made to the particular business application 114, including a recordation of which views have been modified and the keys of the corresponding entries that have been added, deleted, or changed. The set of transport requests 126 can correspond to various changes and modifications made to the source system 102, including those that are to be provided to or installed and configured at particular target systems 146. One or more of the transport requests 126 can be sent to specific target systems 146 in order to implement the same changes as those recorded by the transport request 126. In general, transport requests 126 allow for changes made to one system (i.e., the source system 102) to be made to a corresponding second system (i.e., one of the target systems 146). As stated above, changes made to a development system can be tested and confirmed. Once the changes are complete and determined to be valid, those changes can be included in a transport request 126 and sent to a production, or "live," system, where the verified changes can then be implemented within the production system. In some instances, the changes and/or transport request may also be sent to a consolidation system (not shown in FIG. 1) prior to being sent to a production system or to software delivery in the case of a software vendor.

Each transport request 126 may include a data file, cofiles, profile files, transport logs, entries in data base tables, and support packs, as well as any other suitable information. The data file can contain the transport data, or the actual data that is being transported. The data file can be an eXtensible Markup Language (XML) file, a text file, a comma-delimited text file, a spreadsheet, or any other suitable file and/or format. The cofiles may contain information on change requests, such as the different steps of a change request and their exit codes. The profile files may include profile parameters and information defining the transport request. The transport logs may include logs, trace files, and statistics associated with the transport request. The support packs can contain update and enhancement related files.

Prior to the information in the present disclosure, transport requests 126 have not generally been used for creation of documentation associated with the modifications made to the source system 102. Instead, software documentation associated with the changes is usually generated manually while the changes are made within the source (or development) system 102. For example, if a particular transport request 126 was associated with a change in sales tax values, such as a change in sales tax from 10% to 20% in California, then the transport request 126 would generally contain information stating that the sales tax value was changed for the entry of "California." In order to obtain a complete set of information, additional information associated with the source system 102 is necessary. In the present example, additional information can be found within a view metadata repository 130 and a customizing data repository 134.

The view metadata repository 130 provides information and a description of the structure of a particular view. For example, where a particular view is directed towards a single database, the associated view metadata in the view metadata repository 130 defines the structure of that database. Similarly, when a particular view is directed towards a combination of databases or files, the associated view metadata defines the joins, combinations, and structure of the particular view such that meaningful structural information on the view can be identified, and thus used for further processing. As an example, the view associated with the change in state sales tax may have two columns—one field for a particular state and one field for the current sales tax percentage. The view metadata can define which of the fields are key fields (in the example, State is a key field), and which fields define information or data associated with the key field. The view metadata for a particular view can also provide a textual description of particular fields and the types of parameters or input associated with the fields, such as the type of information or data that can be inserted into the field (i.e., text, string, numerical data, etc.). In some instances, the view metadata repository 130 can include a plurality of database schema and view schema, which provide structural descriptions of the databases and views included within the source system 102.

As previously described, a transport request 126 can describe what information and key fields have been touched by the modifications to the source system. In some instances, the transport request 126 may not describe the actual changes made to the source system 102, but instead may simply reference the particular keys that are modified. In those instances, the actual values of the views and databases that have been modified are stored in the customizing data repository 134. The customizing data repository 134 stores or references the various views and databases of the source system 102, and can be accessed by standard methods (such as Standard Query Language (SQL) requests) to retrieve the data included in a particular view and/or database. Specifically, the information from the transport request 126 can be used to access one or more views and/or databases to retrieve the modified information. The customizing data repository 134 can, in some instances, refer to databases and views that have not been modified, in addition to those that have been modified. In some instances, the customizing data repository 134 can store information and parameters set for a particular instance of the source system 102. Although illustrated as solely within the source system 102, the customizing data repository 134, as well as the view metadata repository 130, may be stored, partially or in full, outside the source system 102. The repositories 130, 134 can be accessible via network 142. Alternatively, one or more external memory and data sources 138 may be used to store some or all of the information described as associated with the source system 102.

As illustrated, the transport requests 126, view metadata repository 130, and the customizing data repository 134 are included within memory 122. Memory 122 can store data and program instructions, including the customized information and data associated with a specific installation or instance of a business application 114. Memory 122 may include any memory or database module and may take the form of volatile or non-volatile memory including, without limitation, magnetic media, optical media, random access memory (RAM), read-only memory (ROM), removable media, or any other suitable local or remote memory component. Memory 122 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the source system 102 and its one or more business applications 114.

Returning to the customizing documentation module 118, the customizing documentation module 118 at the source system 102 can combine information from the set of transport requests 126, the view metadata repository 130, and the customizing data repository 134 to automatically generate a set of software installation customizing documentation and instructions for replicating modifications made to the development-version business application 114 at one or more of the target systems 146. By retrieving information the transport requests 126 and repositories 130, 134, specific, clear, and concise instructions for the modifications to be made to a target system 146 can be generated. Those generated customizing documentation can be stored with a set of customizing documentation 136, also stored in memory 122 in FIG. 1. In some instances, customizing documentation 136 can be stored in one or more locations remote from the source system 102. FIG. 3 below illustrates one example technique performed by the customizing documentation module 118 to automatically generate the customizing documentation and instructions for view maintenance. Additionally, while illustrated as separate from the business application 114, the customizing documentation module 118 may be embedded within or a part of the functionality of the business application 114 itself. Alternatively, the customizing documentation module 118 may be offered as an on-demand service in a cloud computing network, or as an application or agent running by an administrator, client, or other user via network 142.

As described, FIG. 1 includes one or more target systems 146. Each target system 146 may be a live or production system used by one or more entities. Similar to the source system 102, each target system 146 may be represented by one or more servers or other computers or systems, as appropriate. In general, each target system 146 associated with a particular source system 102 will execute an instance of a business application 158 similar to the business application 114 executed in the source system 102. One or more of the target systems 146 may also execute other applications and perform functions other than those performed by the business application 158. Because the target systems 146 are generally production systems, the changes made in the source system 102 are generally not implemented until a specific transport request 126 from the source system 102 is received. In the present system, each transport request 126 received by a particular target system 146 may include or be associated with a set of customizing documentation 136, providing the administrators and users of the particular target system 146 with detailed and exacting documentation as to the changes included within and identified by the transport request 126, including any operations that may need to be manually executed. Additionally, in some instances, the business application 158, or another application associated therewith, may automatically perform the identified operations and changes detailed and described by the transport request 126 and the customizing documentation 136.

Similar to the source system 102, the target systems 146 illustrated in FIG. 1 include an interface 150, a processor 154, and a memory 162. The interface 150 and processor 154 may perform operations similar to the analogous components of the source system 102. The interface 150 and/or processor 154 may perform additional functionality as compared to their counterpart components within the source system 102 in some instances, as well as a subset of their counterparts' functionality in other instances. Each target system 146 may include a memory 162, where information specific to that instance of the business application 158, as well as any other functionality associated with the target system 146, can be stored. As illustrated in FIG. 1, memory 162 includes a view metadata repository 166, a customizing data repository 170, and a repository for received transport requests and customizing documentation 174. Each transport request 126 and set of customizing documentation received by a particular target system 146 can be stored (in 174), available for reference, viewing, or use by an administrator, user, or client associated with that target system 146.

The illustrated environment of FIG. 1 also includes one or more clients 178. Each client 178 may be any computing device operable to connect to or communicate with at least one of the source system 102 and one of the target systems 146, either directly or via the network 142 using a wireline or wireless connection. Each client 178 includes a processor 186, an interface 182, a memory 194, a graphical user interface (GUI) 198, and a client application 190. In general, client 178 comprises an electronic computer device operable to receive, transmit, process, and store any appropriate data associated with the environment 100 of FIG. 1. It will be understood that there may be any number of clients 178 associated with, or external to, environment 100. For example, while illustrated environment 100 includes two clients 178, alternative implementations of environment 100 may include a single client or multiple clients communicably coupled to source system 102 and/or one of the target systems 146, or any other number of clients suitable to the purposes of the environment 100. Additionally, there may also be one or more additional clients 178 external to the illustrated portion of environment 100 that are capable of interacting with the environment 100 via the network 142. Further, the term "client" and "user" may be used interchangeably as appropriate without departing from the scope of this disclosure. Moreover, while each client 178 is described in terms of being used by a single user, this disclosure contemplates that many users may use one computer, or that one user may use multiple computers.

The GUI 198 associated with client 178 comprises a graphical user interface operable to, for example, allow the user of client 178 to interface with at least a portion of the platform for any suitable purpose, such as creating, preparing, requesting, modifying, or analyzing data, as well as viewing and accessing documents and files associated with various business transactions. Generally, the GUI 198 provides the particular user with an efficient and user-friendly presentation of business data provided by or communicated within the system. The GUI 198 may comprise a plurality of customizable frames or views having interactive fields, pull-down lists, and buttons operated by the user. For example, GUI 198 may provide interactive elements that allow a user to enter or select elements of business process instances associated with business applications 114, 158 in GUI 198. Portions of the business applications 114, 158 associated with either the source system 102 or one of the target systems 146 may be presented and accessible to the user through GUI 198, such as through a web browser or client application 190, for example. More generally, GUI 198 may also provide general interactive elements that allow a user to access and utilize various services and functions of client application 190. The GUI 198 is often configurable, supports a combination of tables and graphs (bar, line, pie, status dials, etc.), and is able to build real-time portals, where tabs are delineated by key characteristics (e.g. site or micro-site). Therefore, the GUI 198 contemplates any suitable graphical user interface, such as a combination of a generic web browser, intelligent engine, and command line interface (CLI) that processes information in the platform and efficiently presents the results to the user visually. In some instances, the client application 190 may be a remote module, agent, or portion of the business application 114, 158, allowing users to access and modify data and values within either the source system 102 or one of the target systems 146. In some instances, the client application 190 may be a web-based application, or even a web browser, that can perform tasks other than those associated with one of the systems 102, 146. In some instances, the client application 190 may be used by a remote administrator to initialize or interact with the customizing documentation module 118 to request and cause the generation of customizing documentation associated with the source system 102, as well as to identify one or more of the target systems 146 to which to provide the associated transport request 126 and customizing documentation 136.

As used in this disclosure, client 178 is intended to encompass a personal computer, touch screen terminal, workstation, network computer, kiosk, wireless data port, smart phone, personal data assistant (PDA), one or more processors within these or other devices, or any other suitable processing device. For example, each client 178 may comprise a computer that includes an input device, such as a keypad, touch screen, mouse, or other device that can accept user information, and an output device that conveys information associated with the operation of the source system 102 (and business application 114), one of the target systems 146 (and business application 158), or the client 178 itself, including digital data, visual information, the client application 190, or the GUI 198. Both the input and output device may include fixed or removable storage media such as a magnetic storage media, CD-ROM, or other suitable media to both receive input from and provide output to users of client 178 through the display, namely, the GUI 198.

While FIG. 1 is described as containing or being associated with a plurality of elements, not all elements illustrated within environment 100 of FIG. 1 may be utilized in each alternative implementation of the present disclosure. For example, although FIG. 1 depicts a source system 102 external to network 142, one or more servers or computers associated with source system 102, as well as some or all of business application 114, may be included within network 142 as part of a cloud network solution, for example. In some additional instances, the source system 102 may be a target system 146 for purposes of receiving transport requests, whereby one of the target systems 146 illustrated in FIG. 1 is then a source system in such an instance. Additionally, one or more of the target systems 146 as illustrated in FIG. 1 may include or be associated with a customizing documentation module similar to that of element 118 (or, in some instances, the same customizing documentation module), such that any transport requests generated by those target systems 146 can generate corresponding customizing documentation for the target of the transport request. Still further, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes, in addition to those purposes described herein.

Figure 2:
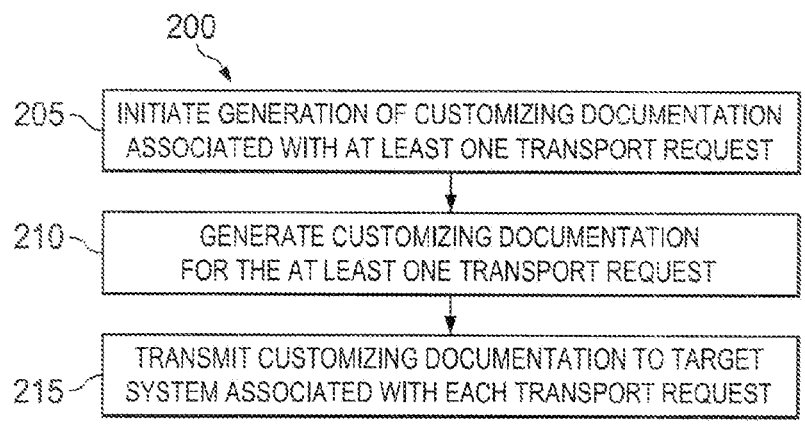
FIG. 2 is a flowchart of an example method for generating and transmitting software documentation from a source system to a target system.

FIG. 2 is a flowchart of an example method 200 for generating and transmitting software documentation from a source system to a target system. For clarity of presentation, the description that follows generally describes method 200 in the context of environment 100 illustrated in FIG. 1 from the perspective of a source system. However, it will be understood that method 200 may be performed, for example, by any other suitable system, environment, or combination of systems and environments, as appropriate.

At 205, the generation of a set of customizing documentation associated with at least one transport request is initiated. In some instances, a transport request may be associated with a single target system, such as when a particular production system is to receive customer-specific and customized updates. Alternatively, transport requests may be used to make similar modifications and corrections to a plurality of target systems to cause similar changes and modifications. In some instances, the initiation of the customizing documentation's generation can be caused by an affirmative action performed by an administrator or other user associated with the source system. For example, the administrator can initiate the generation of customizing documentation through a web application or interface, requesting that the customizing documentation be created for a particular transport request. In some instances, the initiation can request customizing documentation to be generated for a single transport request, while in other instances, the initiation can request customizing documentation be generated for two or more transport requests, such as a batch request for customizing documentation.

At 210, the customizing documentation associated with at least one transport request are generated. While method 300 of FIG. 3 provides additional details as to how the customizing documentation are generated, the customizing documentation may be generated by a specific module, application, agent, or other software located at, or remote to, the source system. In some instances, a customizing documentation module may be provided at or associated with the source system, and may access the identified transport requests to begin the creation of the customizing documentation. In some instances, the transport request may include general information defining the views, database tables, and fields modified at the source system, and to be replicated or repeated in the one or more target systems. In other instances, the transport request may include specific information as to how those views, database tables, and fields were actually modified, such as the original and modified values of one or more fields in a view or database table, and/or the changes made to specific files or other information within the source system. When the transport request does not include the specific information, the customizing documentation module may access one or more repositories in the source system to identify the actual changes made, and generate the customizing documentation corresponding to those changes. For example (and as illustrated in FIG. 1), the customizing documentation module may have access to both view metadata and customizing data defined within the source system. After referencing the information on the affected views, tables, files, and fields in the transport request, the customizing documentation module can access the affected elements to generate the corresponding customizing documentation. In some instances, multiple views and/or database tables may be modified according to the transport request. In those instances, information from each affected (or modified) view and database table, as identified by the transport request, may be accessed and retrieved. The structure and fields of the affected view or database table can be determined from accessing a view metadata repository, while the modified information can be retrieved from a corresponding customizing data repository.

For each set of information retrieved, the customizing documentation module can generate or write to a file, such as an XML file, text file, or other file, as appropriate, denoting the specific modifications made to the source system associated with the transport request. The generated file, or the customizing documentation, can provide specific documentation relating to the various modifications made to different views and database tables of the source system. By using the customizing documentation, detailed and specific documentation can be provided to users and administrators of target systems, allowing those target system users and administrators to have a detailed explanation of the modifications being made to their system associated with a received transport request. At 215, the generated customizing documentation are transmitted to the target system associated with the corresponding transport request. The generated textual customizing documentation can be used to manually perform the modifications at the target system, and may be sent to a specific user, administrator, or other recipient or address associated with or at the target system. In other instances, the customizing documentation may be used primarily for documentation purposes in order to maintain a history of changes made to a system. In other instances, the customizing documentation may be used as documentation on how to implement changes in a system. In some instances, the transport request and the corresponding customizing documentation may be bundled together when transmitted to the target system, although in other instances, the two may be separated.

FIG. 3 is a flowchart of an example method 300 for automatically generating software documentation based on a transport request. Similar to FIG. 2, the description that follows generally describes method 300 in the context of environment 100 illustrated in FIG. 1. Specifically, FIG. 3 illustrates method 300 as accessing a transport request 126, the view metadata repository 130, and the customizing data repository 134 at various intervals. In some instances, the information shown as being retrieved from these entities may be retrieved from other suitable locations. In general, it will be understood that method 300 may be performed, for example, by any other suitable system, environment, or combination of systems and environments, as appropriate.

At 302, the automatic creation of a set of customizing documentation for a particular transport request is initiated. In some instances, the creation of the customizing documentation may be initiated in response to a manual request from an administrator or user associated with the source system in which the transport request is generated, while in other instances, the generation may be automatically initiated based on a particular event. In some instances, the initiating event may include the creation of a new transport request at the source system, a daily (or other time interval-based) operation for generating customizing documentation, or any other appropriate initiating event.

At 306, a determination is made as to whether the transport request includes information on a modified view or database table from the source system. To do so, the operation at 306 may access the associated transport request 126 to make the determination. Where no information on modified views or database tables are included in the transport request, method 300 continues to 310, where method 300 ends. If, however, information on one or more views and/or database tables (or other files) is included in the transport request, then method 300 continues at 314.

At 314, the first affected view or database table from the transport request 126 is identified or retrieved. The method 300 may loop for each affected view or database table identified in the transport request (as illustrated by box 378), allowing a full set of modification information for the transport request to be included in the customizing documentation. At 318, information regarding the n-th view (in the first iteration, the first view) affected and associated with the transport request is gathered and written to an output associated with the customizing documentation. For example, the n-th view's technical name and textual view description may be determined and written to the output. As illustrated, this structural and textual information associated with the affected n-th view can be retrieved from the view metadata repository 130. The textual view description may be a name or description of the information included within the view, such as a view entitled "Item Template for Calculation Step Template." The technical name may be the path, location, or reference number associated with the n-th view.

At 322, the transport request 126 can be accessed to determine the key or keys associated with the changed entries in the n-th view. As previously described, the transport request 126 may only include information on the keys that have been modified in the n-th view (or database table). At 322, those keys are identified so that the corresponding information can be retrieved from the appropriate locations. At 326, the structure of the n-th view is identified. As shown in FIG. 3, the view metadata repository is accessed in order to determine the structure of both the underlying database tables associated with the n-th view, as well as the structure of the n-th view itself. In some instances, a determination is made as to which fields are to be maintained or modified within the n-th view, and in which of the underlying or associated database tables those fields are located. It will be understood that the operations of 318, 322, and 326 may be performed in any order or combination, including concurrently and/or sequentially.

At 330, the first view (or database table) key as identified at 322 is accessed or analyzed. For example, if the modified view keys for a change in state sales taxes are for California and Washington, two different view keys would need to be traversed (as illustrated by box 370). At 334, the information associated with the key field entry for the m-th key field entry is written to the output file. In some instances, only an enumeration of the particular key field entry may be written at this time, such as "California" in the previous example.

At 338, the first modified field of the field list associated with the m-th key value is identified. At 342, the first modified field value from the relevant database table associated with the m-th key value is read. As illustrated in FIG. 3, the customizing data repository 134 is accessed to determine the actual value of the identified field. At 346, a textual description of the view field entry is retrieved from the view metadata repository 130. Once the actual data and the description of the view field entry are retrieved, the name/value pair is written to the output at 350. At 354, a determination is made as to whether the current field, or the p-th field, is the last field associated with the m-th key field value. If it is, method 300 continues to 358. If, however, additional fields associated with the current, or m-th key, have been modified and associated with the transport request 126, then method 300 loops through the operations of 342, 346, and 350 (as illustrated by element 362) until each of the fields associated with the m-th key have been written to the output.

At 358, a determination is made as to whether the m-th key is the last modified key field included in the n-th view. If no additional modified keys are associated with the n-th view, then method 300 continues to 366. If, however, additional modified keys are associated with the n-th view, then method 300 loops through the various operations from 334 through 354 (as illustrated by element 370). Similarly, at 366, a determination is made as to whether the current view is the last view associated with the transport request 126. If not, and additional views are associated with the transport request, method 300 returns to 318 to repeat the various operations (as illustrated by element 378). If the current view is the last view associated with the transport request, however, method 300 continues to 374, where the operations end, and the customizing documentation for the identified transport request 126 are completed.

The output, or the customizing documentation, may be an XML file, a text file, a log file, or any other suitable file and format that can be created in a recursive order as described in FIG. 3. The results of the operations described in FIG. 3 can provide an organized and complete set of customizing documentation associated with the changes and modifications defined (or referenced) by the transport request 126. In some alternative instances, the transport request 126 may include additional information than described in FIG. 3, such as the actual values of the entries changes, causing one or more of the operations described in method 300 to be unnecessary and/or repetitive.

Figure 4A:
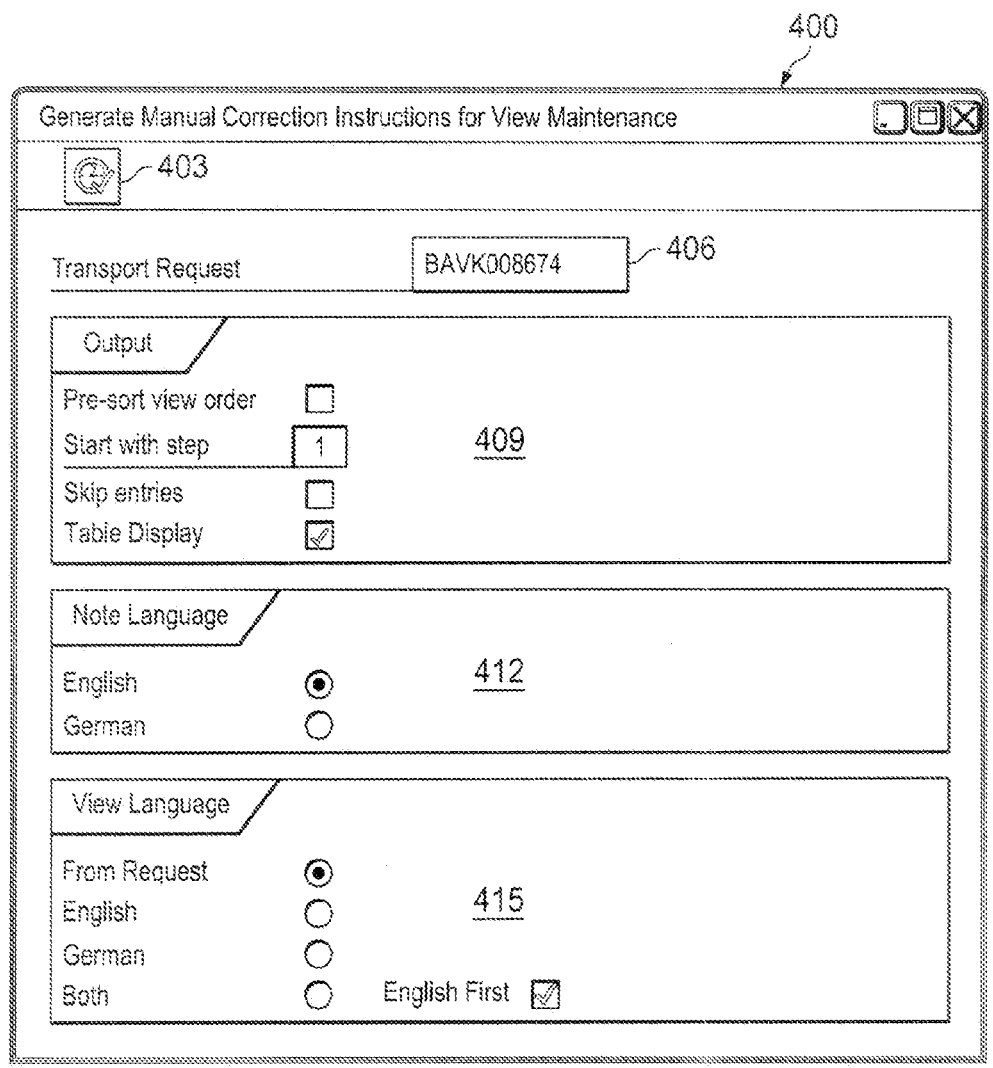

FIGS. 4A-4E are example screenshots of a user interface presenting information associated with an automatic software documentation process. FIG. 4A illustrates a start screen within a user interface 400 that may be presented to an individual, such as an administrator at client 178 of FIG. 1. The start screen includes a button 403 that can be used to initiate the generation of customizing documentation associated with a particular transport request. The UI text box 406 allows the user or administrator to define a particular named or numbered transport request for which to generate the customizing documentation. In some instances, a dropdown box or list of available transport requests may be included on the start screen. Additionally, a search or browse button may also be included, allowing the user or administrator to easily locate the appropriate transport request for which to generate a set of customizing documentation. In some instances, such as that illustrated in FIG. 4A, a set of output parameters may be defined for the generated customizing documentation. A set of general output parameters 409 can be used to determine what to record in the customizing documentation, while a set of note language parameters 412 and view language parameters 415 can allow the administrator to determine how and in what language to present the output results in the customizing documentation.

Figure 4B:
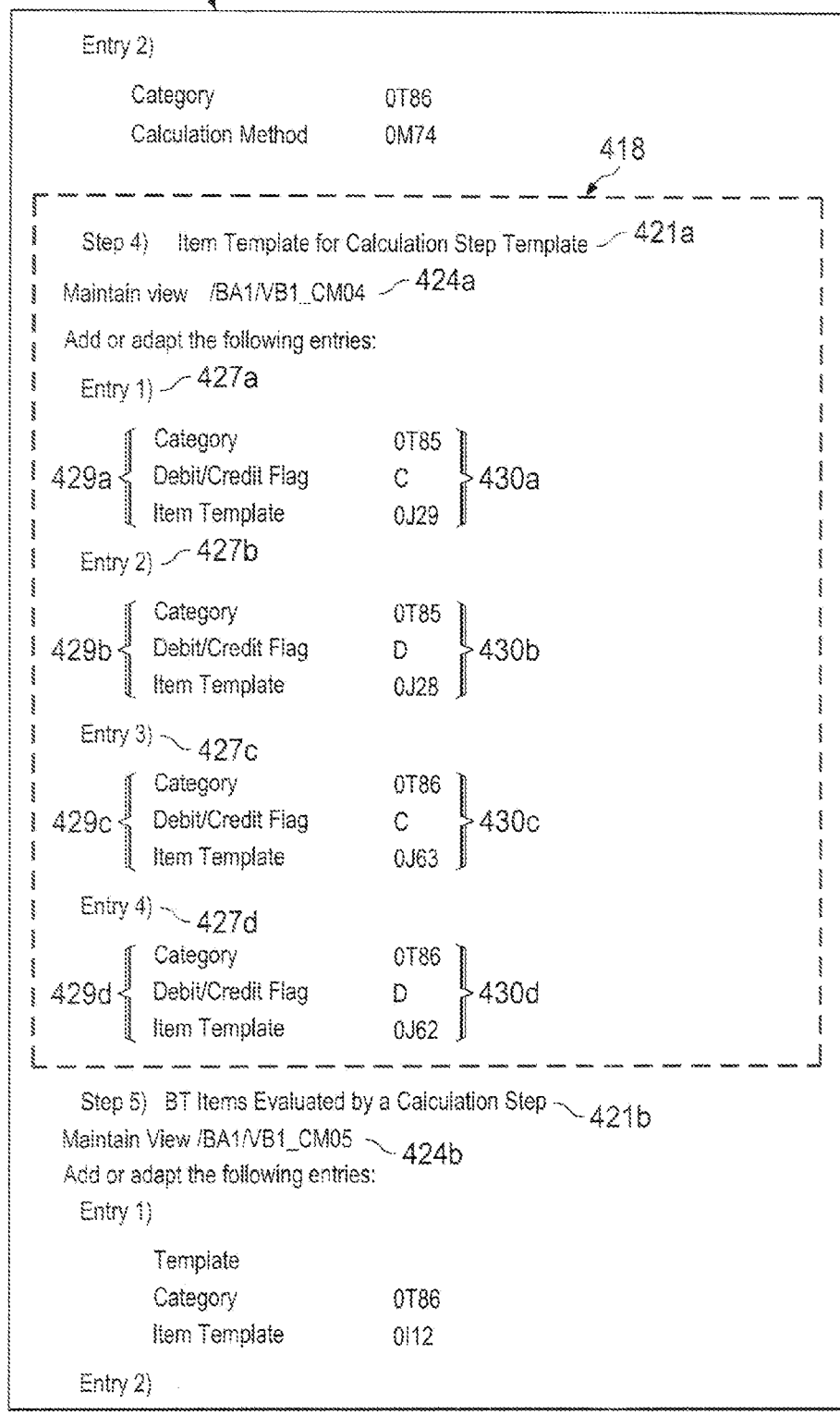

FIG. 4B illustrates a portion of a set of example customizing documentation within a user interface 400 generated from use of a process similar to that of method 300. The identified portion 418 of the customizing documentation illustrated in FIG. 4B is associated with the fourth view modified within the corresponding transport request, as denoted by the phrase "Step 4)". The phrase "Item Template for Calculation Step Template" 421a refers to the name of the view associated with the information in the transport request. Specifically, the phrase "/BA1/VB1_CM04" 424a represents the unique identifier within the source system of the fourth view specified in the corresponding transport request. Entries 427a, 427b, 427c, and 427d refer to the four different entries of the view identified as modified within the transport request. For each of the entries, some information is retrieved from an associated view metadata repository, while other information is retrieved from a customizing data repository. For example, and as described in elements 334 and 346 of FIG. 3, the textual description or name of each view field for a particular entry is identified within the view metadata repository and presented in elements 429a-d. The actual values for each of those fields are read from the customizing data repository and presented in elements 430a-d. Each name and value pair can be retrieved together during a recursive operation as described in FIG. 3. Further, the transport request associated with the customizing documentation includes additional, modified views, as illustrated by the phrase "Step 5)" and the name of the view, "BT Items Evaluated by a Calculation Step" 421b, as well as the transport request identifier 424b of "/BA1/VB1_CMOS". Any number of views may be associated with the modifications in the transport request, and the source system (or its customizing documentation module) can be used to generate a list of changes to be made throughout the associated target system.

Figure 4C:
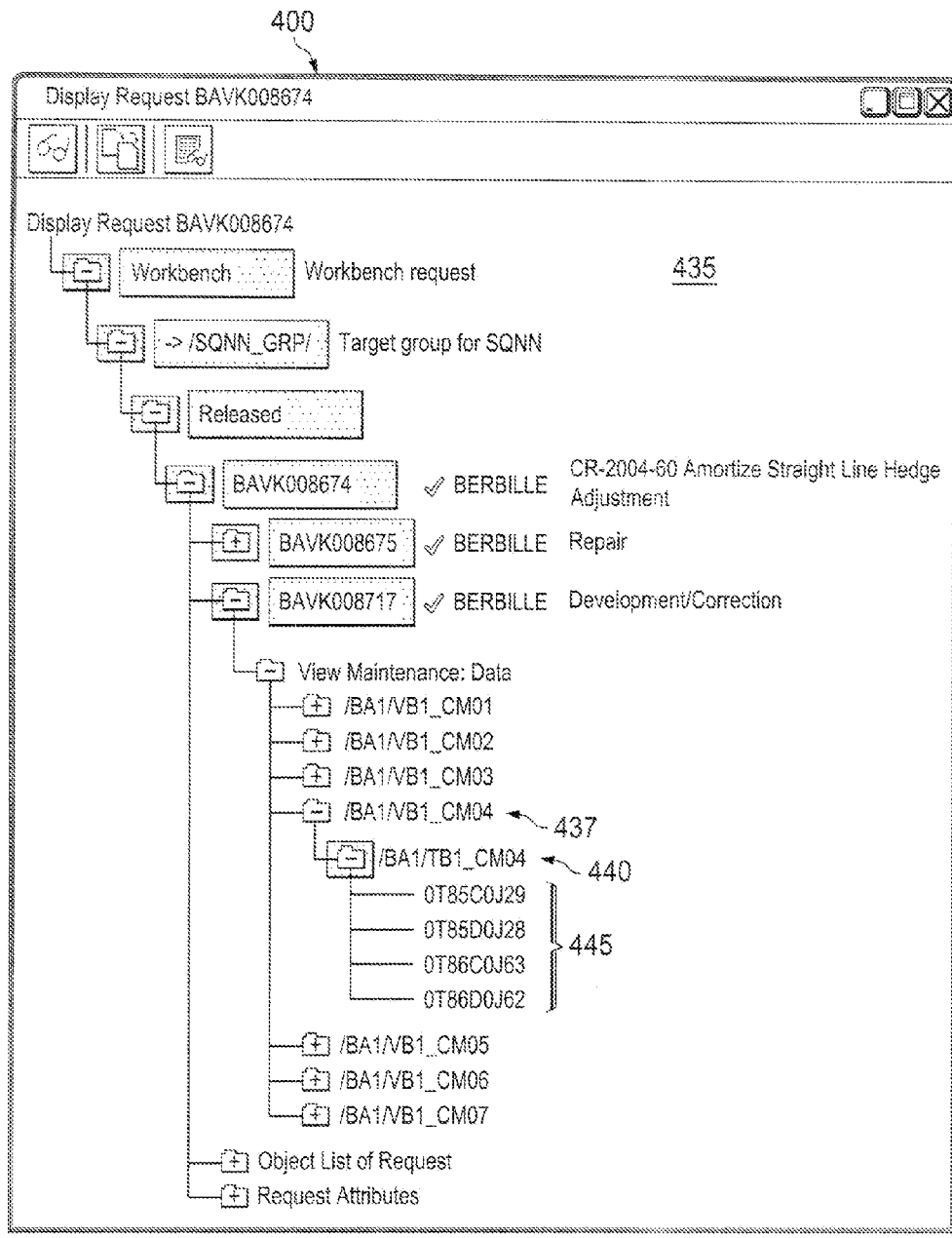
Figure 4D:
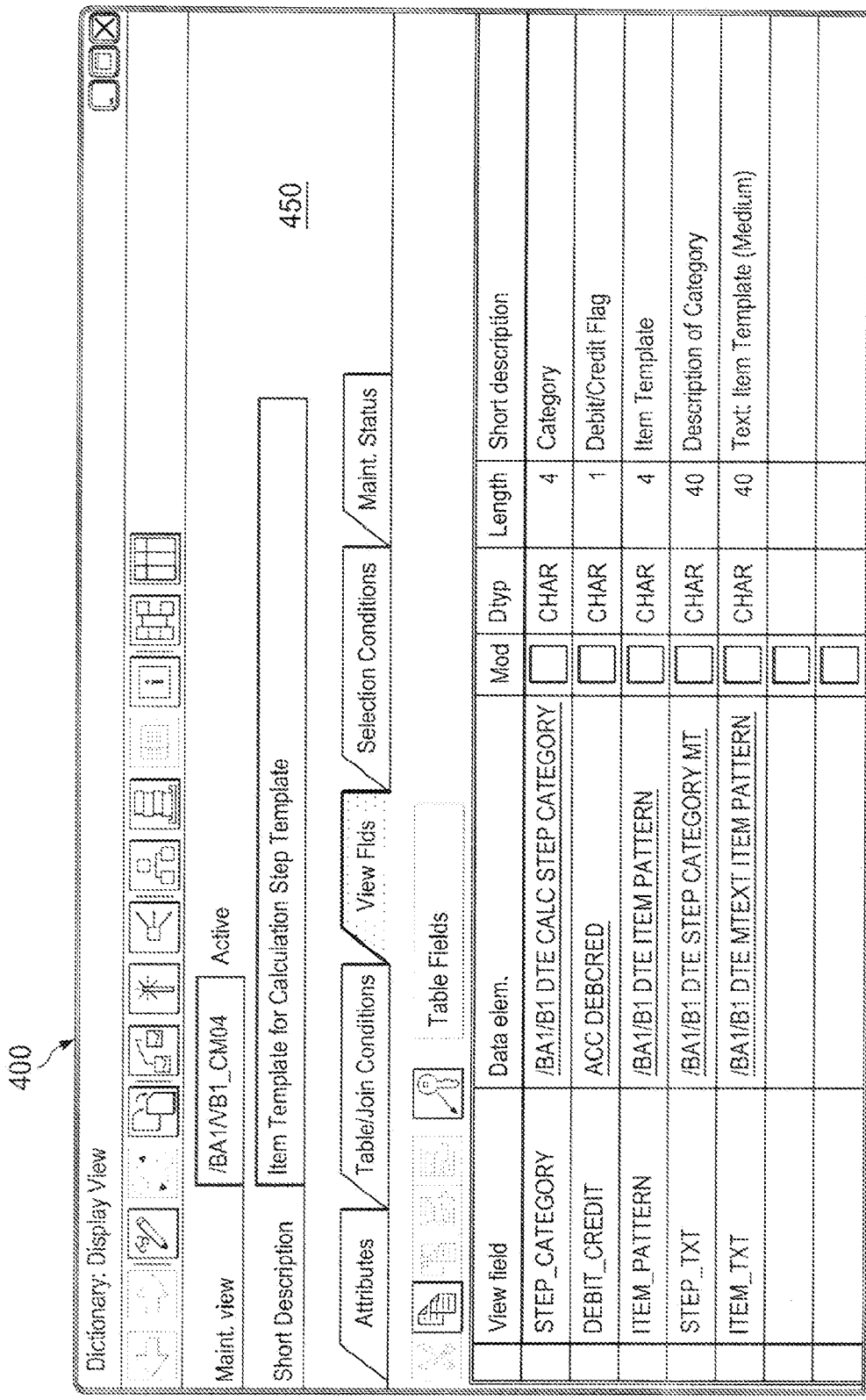

FIGS. 4C-4E illustrate examples of a portion of a transport request (FIG. 4C), and the set of view metadata (FIG. 4D) and the set of customizing data (FIG. 4E) associated with that portion of the transport request. In FIG. 4C, the transport request 435 is illustrated as a hierarchical set of information defining the various views and keys being modified. The transport request identifies a view entitled "/BA1/ VB1_CM04" 437 as a modified view, and further includes a particular table within that view, "/BA1/TB1_CM04" 440, as the table where information has been modified. The correction and modification information associated with the identified view 437 is included within portion 318 of the customizing documentation illustrated in FIG. 3. Specifically, the technical name of the view 437 used in the transport request included is illustrated in element 421 a of the example customizing documentation. Elements 445 of FIG. 4C describe the keys of the changed view entries to be used when accessing the database.

FIG. 4D illustrates an example set of view metadata 450 associated with the "Item Template for Calculation Step Template" view, defining the names of the view's fields, data elements, data types, and lengths, as well as a short technical description. As illustrated by the non-activated tabs above, additional information defining the structure of the view is included within the view metadata for the view. This information can also be used to populate information in the example customizing documentation. For example, the customizing documentation modules 118 of FIG. 1 can use the transport request (of FIG. 4C) to identify and reference the modified fields of the view, adding the textual descriptions or names of the fields at elements 429a-d in the customizing documentation of FIG. 4B.

FIG. 4E illustrates an example set of customizing data 460 associated with the view 437 identified in the transport request (of FIG. 4C) and defined by the view metadata 450 (of FIG. 4D). The customizing data 460 presents the actual values associated with each of the view's field entries, where the items identified in element 464 represent the modified data. Example method 300 can access the set of customizing data after identifying the particular fields that have been modified from the transport request and the information on the customizing data from the set of view metadata. Combining the set of information from the transport request 435, the set of view metadata 450, and the set of customizing data 460, a set of customizing documentation associated with the particular view 437 can be generated using method 300 (or any other suitable method) to create the customizing documentation illustrated in FIG. 4B.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method performed by one or more processors for automatically generating software documentation, the method comprising the following operations:
   identifying a transport request identifying at least a portion of a set of modifications made to a first instance of a business application in a source system, where the set of modifications are to be implemented in a second instance of the business application in a corresponding target system;
   identifying at least one view identified by the transport request, each identified view comprising a modified view of information associated with the business application;
   accessing, for each identified view, a set of metadata information describing a structure of the particular identified view, the set of metadata information stored in memory associated with the source system;
   identifying, for each identified view, at least one database table associated with the particular identified view;
   accessing, for each identified database table associated with each identified view, at least one database table field modified by the transport request and values associated with each of the at least one database table fields, the identified database tables stored in memory associated with the source system;
   outputting, for each identified view, at least a portion of the set of metadata information describing the structure of the particular identified view to a customizing documentation file;
   outputting, for each identified database table associated with each identified view, at least a portion of the values associated with each of the at least one database table fields to the customizing documentation file; and
   transmitting the transport request and the customizing documentation file to the corresponding target system associated with the second instance of the business application.

2. The method of claim 1, further comprising identifying the transport request in response to a request to initiate generation of a set of customizing documentation.

3. The method of claim 2, wherein the request to initiate generation of the set of customizing documentation identifies a particular transport request.

4. The method of claim 2, wherein the request to initiate generation of the set of customizing documentation is received from at least one of the following: a manual request for generation of the set of customizing documentation from an administrator or an automatic request in response to a triggering event.

5. The method of claim 4, wherein the triggering event includes a recurring scheduled event.

6. The method of claim 1, wherein the source system includes at least one of a development application system or a testing environment system.

7. The method of claim 1, wherein at least one target system includes a production application system.

8. The method of claim 1, wherein the customizing documentation file comprises at least one of a text file, a log file, or an eXtensible Markup Language (XML) file.

9. The method of claim 1, wherein the set of metadata information includes one or more of the following: a textual description of the identified view, the structure of the identified view, and at least one database table associated with the identified view.

10. The method of claim 1, wherein:
accessing the set of metadata information comprises accessing at least one view metadata repository; and
accessing at least one database table field comprises accessing at least one customizing data repository.

11. The method of claim 10, wherein at least one of the view metadata repository and the customizing data repository is stored remote from the source system.

12. A computer program product encoded on a non-transitory tangible storage medium, the product comprising computer readable instructions for causing one or more processors to perform operations comprising:
identifying a transport request identifying at least a portion of a set of modifications made to a first instance of a business application in a source system, the transport request associated with at least one target system and the set of modifications to be implemented in a second instance of the business application in the target system;
identifying at least one view identified by the transport request, each identified view comprising a modified view of information associated with the business application;
accessing, for each identified view, a set of metadata information describing a structure of the particular identified view, the set of metadata information stored in memory associated with the source system;
identifying, for each identified view, at least one database table associated with the particular identified view;
accessing, for each identified database table associated with each identified view, at least one database table field modified by the transport request and values associated with each of the at least one database table fields, the identified database tables stored in memory associated with the source system;
outputting, for each identified view, at least a portion of the set of metadata information describing the structure of the particular identified view to a customizing documentation file; outputting, for each identified database table associated with each identified view, at least a portion of the values associated with each of the at least one database table fields to the customizing documentation file; and
transmitting the transport request and the customizing documentation file to the corresponding target system associated with the second instance of the business application.

13. The computer program product of claim 12, the operations further comprising identifying the transport request in response to a request to initiate generation of a set of customizing documentation.

14. The computer program product of claim 12, wherein outputting comprises writing to a customizing documentation file.

15. The computer program product of claim 14, wherein the customizing documentation file comprises at least one of a text file, a log file, or an eXtensible Markup Language (XML) file.

16. The computer program product of claim 14, the operations further comprising transmitting the transport request and the customizing documentation file to the at least one target system associated with the transport request.

17. A system comprising:
memory operable to store at least one transport request and at least one repository associated with at least one view of information associated with a business application; and
one or more processors operable to:
identify a transport request identifying at least a portion of a set of modifications made to a first instance of the business application in a source system, where the set of modifications are to be implemented in a second instance of the business application in a corresponding target system;
identify at least one view identified by the transport request, each identified view comprising a modified view of information associated with the business application;
access, for each identified view, a set of metadata information describing a structure of the particular identified view, the set of metadata information stored in memory associated with the source system;
identify, for each identified view, at least one database table associated with the particular identified view;
access, for each identified database table associated with each identified view, at least one database table field modified by the transport request and values associated with each of the at least one database table fields, the identified database tables stored in memory associated with the source system;
output, for each identified view, at least a portion of the set of metadata information describing the structure of the particular identified view to a customizing documentation file;
output, for each identified database table associated with each identified view, at least a portion of the values associated with each of the at least one database table fields to the customizing documentation file; and
transmitting the transport request and the customizing documentation file to the corresponding target system associated with the second instance of the business application.

18. The system of claim 17, wherein the business application is associated with a source system, and further wherein the transport request is associated with at least one target system.

* * * * *